Jan. 21, 1969   K. V. KORDESCH ETAL   3,423,243
CURRENT COLLECTION MEANS FOR FUEL CELLS
Filed July 30, 1962

INVENTORS
KARL V. KORDESCH
JOHN F. YEAGER
BY
ATTORNEY

United States Patent Office 3,423,243
Patented Jan. 21, 1969

3,423,243
CURRENT COLLECTION MEANS FOR FUEL CELLS
Karl V. Kordesch, Lakewood, and John F. Yeager, Brookpark Village, Ohio, assignors to Union Carbide Corporation, a corporation of New York
Continuation-in-part of application Ser. No. 764,342, Sept. 30, 1958. This application July 30, 1962, Ser. No. 213,249
U.S. Cl. 136—86        1 Claim
Int. Cl. H01m 27/00

The present application is a continuation-in-part of application Ser. No. 764,342 filed Sept. 30, 1958, and now abandoned.

The invention relates to an improved current collection means for fuel cells.

Fuel cells have been known for over a hundred years, but few persons have been able to make a fuel cell which produces energy in an amount approaching the theoretical state. In the past few years, however, fuel cells have been made which are not only able to produce substantially theoretical voltages, but also are able to produce high currents at the same time. Since the power lost in the flow of electric current is proportional to the current squared times the resistance, high currents necessitate low resistances throughout the fuel cell as well as the ancillary equipment.

It has been found that a fuel cell electrode itself can exhibit a relatively high resistance, especially an electrode made of carbon. This resistance is not particularly harmful in a direction perpendicular to the active face since the electrodes are usually thin, but large energy drops will be noticed if the current must travel the length of an electrode, i.e., parallel to an active face, to reach the external circuit.

The principal object of the invention, therefore, is to provide in combination with a fuel cell electrode a current collection means which minimizes the resistive effects of the electrode.

Broadly, the above object is achieved by a combination of a fuel cell electrode and a current collection means in physical and electrical contact therewith at a plurality of points over a surface of the electrode. This current collection means comprises an electric current-conducting central core and a plurality of conducting members attached to the core and radiating therefrom.

Figure 1:
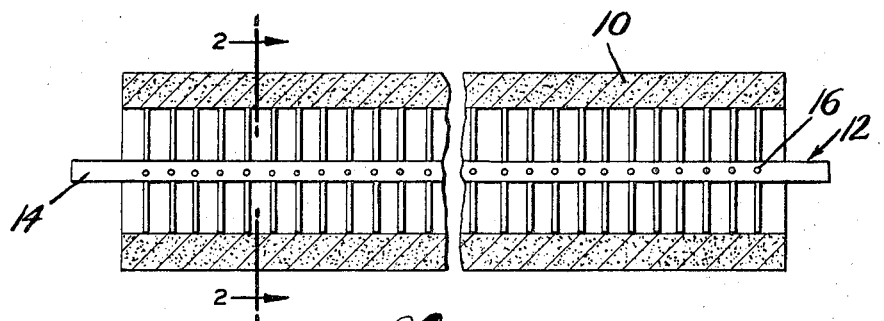
FIG. 1 is a cross-sectional view of a tubular fuel cell electrode in combination with a current collection means in accordance with the invention.
Figure 2:
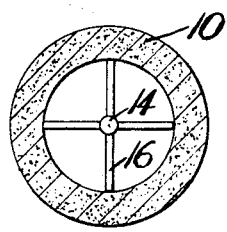
FIG. 2 is a sectional view taken along line 2—2 in FIG. 1, looking in the direction of the arrows.

Referring now to the drawing, FIG. 1 shows a tubular fuel cell electrode 10 having a current collection means 12 in combination therewith. The current collection means 12 comprises a central core 14 made of an electric current-conducting material, such as a metal, and a plurality of conductive bristles 16 attached to the core 14. The bristles 16 contact the inner surface (non-active surface) of the electrode 10 over substantially all of the inner surface area. FIG. 2 illustrates this construction by a view taken along lines 2—2 in FIG. 1. In this construction, electric current produced at the outer surface (active surface) of the electrode 10 has a relatively short distance to travel through the electrode before it reaches a low resistance conducting member. Without the current collection means 12, electric current produced at the outer surface on one end might have to travel the length of the electrode to reach a connection to an external circuit. Since an electrode may be highly resistive, a large power drop may result. With the current collection means of the invention, a large power drop is avoided due to the short distance of resistive material through which the current must travel. As used herein, the phrase "active surface" of an electrode means the electrode surface adjacent or to be adjacent the electrolyte in a fuel cell and at which or near which the electrochemical reaction, in general, proceeds. The phrase "non-active surface" means the electrode surface adjacent or to be adjacent a volume of fuel or oxidant, and is generally the electrode surface opposite from the active surface.

Figure 3:
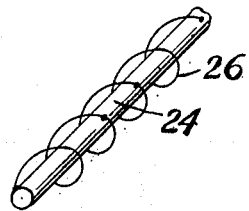
FIG. 3 is a perspective view of another current collection means in accordance with the invention.

FIG. 3 illustrates another embodiment of the current collection means of the invention. As shown there, a central core 24 has a spiral of conducting ribbon 26 attached to the core 24 at frequent intervals. This particular construction may be used in combination with a fuel cell electrode in the same manner as shown in FIG. 1.

Figure 4:
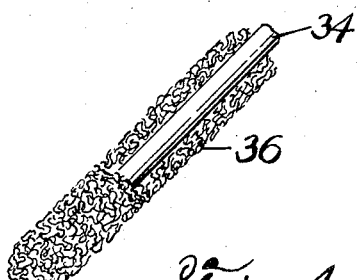
FIG. 4 is a perspective view, partially in section, of another embodiment of the invention.

FIG. 4 shows another embodiment, partially in section, of the invention. As shown there, a central core 34 has a knitted conducting fiber 36, such as a metal wool, attached to the core 34. This construction is also useful with a fuel cell electrode in the same manner as shown in FIG. 1.

It will be apparent that a force fit of the current collection means in the fuel cell electrode will establish electrical contact, and that in some constructions of the current collector, especially the knitted fiber construction, electrical contact between the radiating conducting members and the central core can be established by a force fit. The word "attached" as used herein, therefore, refers to any contact or attachment which establishes electrical conduction.

The current collector may be made of any materials which are reasonably conductive. Most metals, such as copper, silver, nickel and iron, will serve this purpose and plastics impregnated with conducting materials can also be advantageously employed, especially at lower currents. Furthermore, the collectors may be made for use with flat electrodes. In such a case, the central core would preferably be a flat plate with the conducting members radiating from at least one side, but other constructions, such as a plurality of central cores, each with radiating members placed against the flat electrode, will suffice.

It will also be apparent to those in the art that the non-active surface of a fuel cell electrode must be maintained free of obstructions as much as possible to permit a free flow of gas into the electrode body. The current collection means of the invention permits such a gas flow while at the same time providing an electrical contact of low resistance over the electrode face.

Fuel cells utilizing the current collection means of the invention have been successfully operated with excellent results. In cells having tubular carbon electrodes with the external circuit attached to one end of the carbon tube, power losses of 10 to 15 percent due to electrode resistance are common at high currents. In the same cells but with the current collectors of the invention, the power losses are reduced to less than one percent.

What is claimed is:

1. In combination a fuel cell including at least one electrode having (1) an electrochemically active electrolyte surface and a non-active fuel or oxidant surface, and (2) a current collection means comprising a central core disposed adjacent said non-active surface and a plurality of conducting bristles, each bristle having one end attached to said core and the other end in electrical contact with said non-active surface, said bristles making contact with said electrode over substantially all said non-active surface area.

References Cited

UNITED STATES PATENTS

| | | | |
|---|---|---|---|
| 284,342 | 9/1883 | Tompkins | 136—86.5 |
| 744,216 | 11/1903 | Lyons et al. | 136—86.5 |
| 1,359,881 | 11/1920 | Emanuel | 136—86 |
| 2,117,596 | 5/1938 | Bender et al. | 204—195.1 |
| 2,275,281 | 3/1942 | Berl | 136—121.1 |
| 2,384,463 | 9/1945 | Gunn et al. | 136—86 |
| 470,073 | 3/1892 | Ortelli | 136—86.3 |
| 2,969,315 | 1/1961 | Bacon | 136—86 |
| 3,146,131 | 8/1964 | Linden et al. | 136—86 |
| 3,147,149 | 9/1964 | Postal | 136—120 |
| 3,162,549 | 12/1964 | Jeannin | 136—6 |

FOREIGN PATENTS 428,329  6/1911  France.

WINSTON A. DOUGLAS, *Primary Examiner.*

H. FEELEY, *Assistant Examiner.*

U.S. Cl. X.R.

136—120